United States Patent [19]
Barton

[11] Patent Number: 5,655,413
[45] Date of Patent: *Aug. 12, 1997

[54] ANTIFRICTION ELEMENT FOR USE BETWEEN RELATIVELY SLIDING COMPONENTS OF AN ADJUSTABLE STEERING COLUMN

[75] Inventor: Laurence George Herbert Barton, Warwickshire, England

[73] Assignee: The Torrington Company, Torrington, Conn.

[*] Notice: The term of this patent shall not extend beyond the expiration date of Pat. No. 5,596,907.

[21] Appl. No.: 559,787

[22] Filed: Nov. 15, 1995

Related U.S. Application Data

[63] Continuation-in-part of Ser. No. 263,857, Jun. 22, 1994.

[30] Foreign Application Priority Data

Nov. 17, 1994 [GB] United Kingdom ............... 9423187

[51] Int. Cl.[6] ...................................................... B60D 1/18
[52] U.S. Cl. ................................................ 74/493; 74/531
[58] Field of Search ..................... 74/493, 531; 280/777, 280/775

[56] References Cited

U.S. PATENT DOCUMENTS

| | | | |
|---|---|---|---|
| 4,648,624 | 3/1987 | Mouhot et al. | 280/775 |
| 5,338,064 | 8/1994 | Sadakata et al. | 74/493 |
| 5,481,938 | 1/1996 | Stuedemann et al. | 74/493 |
| 5,531,317 | 7/1996 | Tomaru | 74/493 |

FOREIGN PATENT DOCUMENTS

| | | |
|---|---|---|
| 0 564 898 A2 | 10/1993 | European Pat. Off. . |
| 0 600 700 A1 | 6/1994 | European Pat. Off. . |
| 2 107 439 | 4/1983 | United Kingdom . |
| 2 113 629 | 8/1983 | United Kingdom . |
| 2 259 132 | 3/1993 | United Kingdom . |
| 2 279 728 | 1/1995 | United Kingdom . |

Primary Examiner—Charles A. Marmor
Assistant Examiner—David M. Fenstermacher
Attorney, Agent, or Firm—Michael H. Minns

[57] ABSTRACT

A clamping mechanism for an adjustable steering column for a vehicle in which antifriction elements are provided which interpose between relatively sliding components of an adjustable steering column construction each element allows sliding between limiting stops with resilient means between the stops to provide a soft stop. The resilient means may be a separate member or resilient portions at the ends of a slot in the element. Walls of the element may have longitudinal slits to take up manufacturing tolerance.

10 Claims, 7 Drawing Sheets

ANTIFRICTION ELEMENT FOR USE BETWEEN RELATIVELY SLIDING COMPONENTS OF AN ADJUSTABLE STEERING COLUMN

This invention is a continuation-in-part of application Ser. No. 08/263,857, filed Jun. 22, 1994.

BACKGROUND OF THE INVENTION

This invention relates to an antifriction element for use between relatively sliding components of an adjustable steering column construction for a vehicle.

With known constructions of clamping mechanisms for adjustable steering columns, whether rake and/or reach adjustable, the clamping mechanism allows relative sliding between one part of the steering column and another part of it in an unclamped condition, while the two parts are clamped together once the desired location has been set by the driver. The two parts are typically metal and so the relatively sliding metal faces can give an unsatisfactory "feel" to the user.

The foregoing illustrates limitations known to exist in present adjustable steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column clamping mechanism comprising: a first clamp member; a second clamp member slidable relative to the first clamp member, the first clamp member and second clamp member being in contact with one another when the steering column is in a clamped state; and an antifriction element between the first clamp member and the second clamp member, the antifriction element biasing the first clamp member and the second clamp member out of contact with one another when the steering column is in an unclamped state, the first clamp member and the second clamp member each being in sliding contact with the antifriction element when the steering column is in the unclamped state and wherein the antifriction elements allows sliding between limiting stops and wherein a resilient means is provided between said limiting stops.

The foregoing and other aspects will become apparent from the following detailed description of the invention when considered in conjunction with the accompanying drawing figures.

BRIEF DESCRIPTION OF THE DRAWING FIGURES

Figure 1:
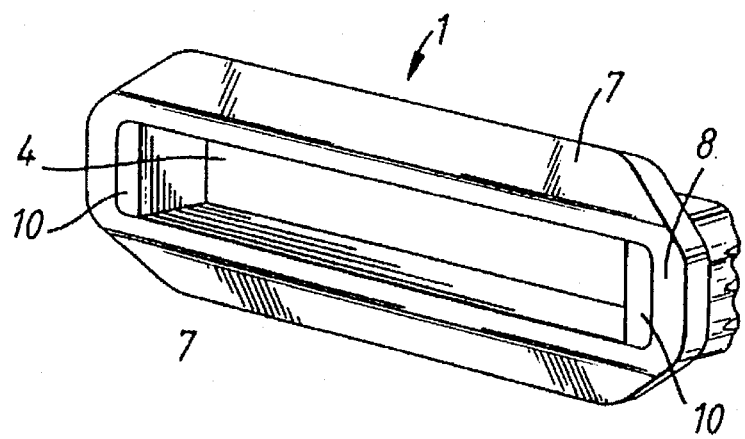
FIG. 1 is a perspective view of an antifriction element according to the invention for use between relatively sliding components of an adjustable steering column construction for a vehicle.
Figure 2:
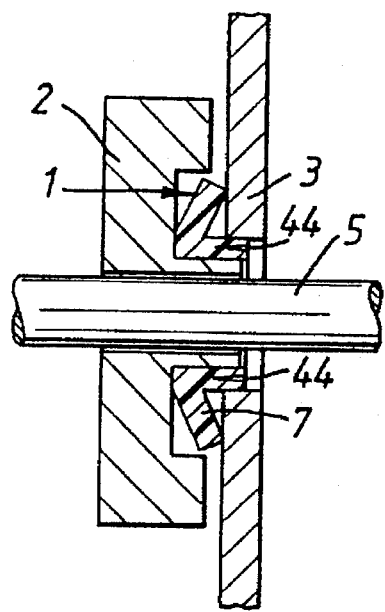
FIG. 2 is a cross section of the antifriction of FIG. 1 located diagrammatically between two such sliding components in an unclamped position.
Figure 3:
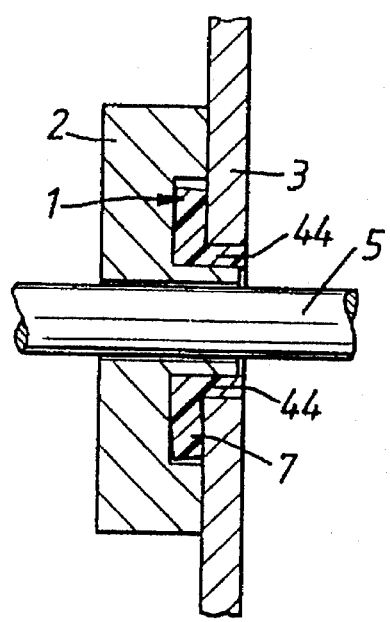
Figure 4:
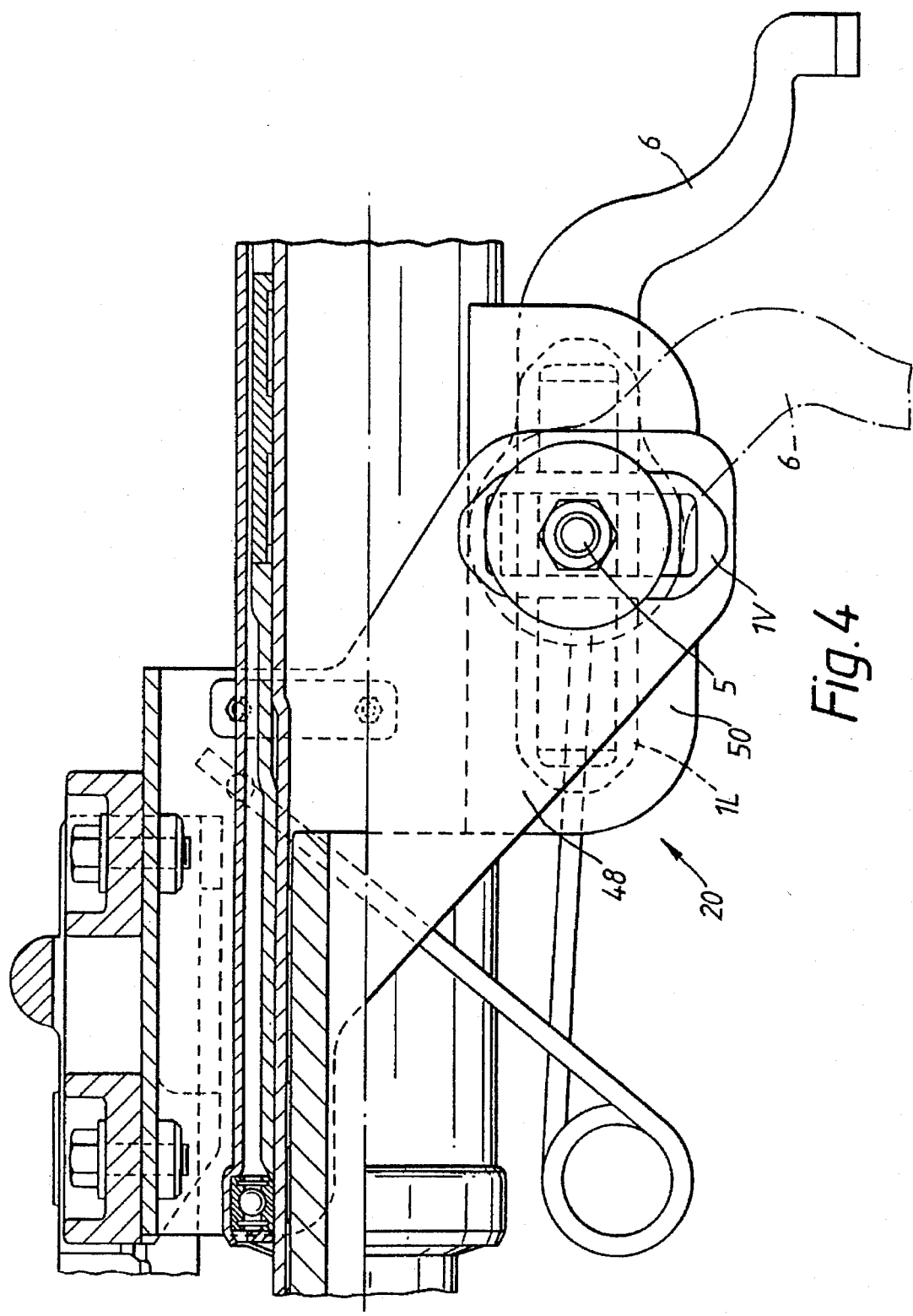
Figure 5:
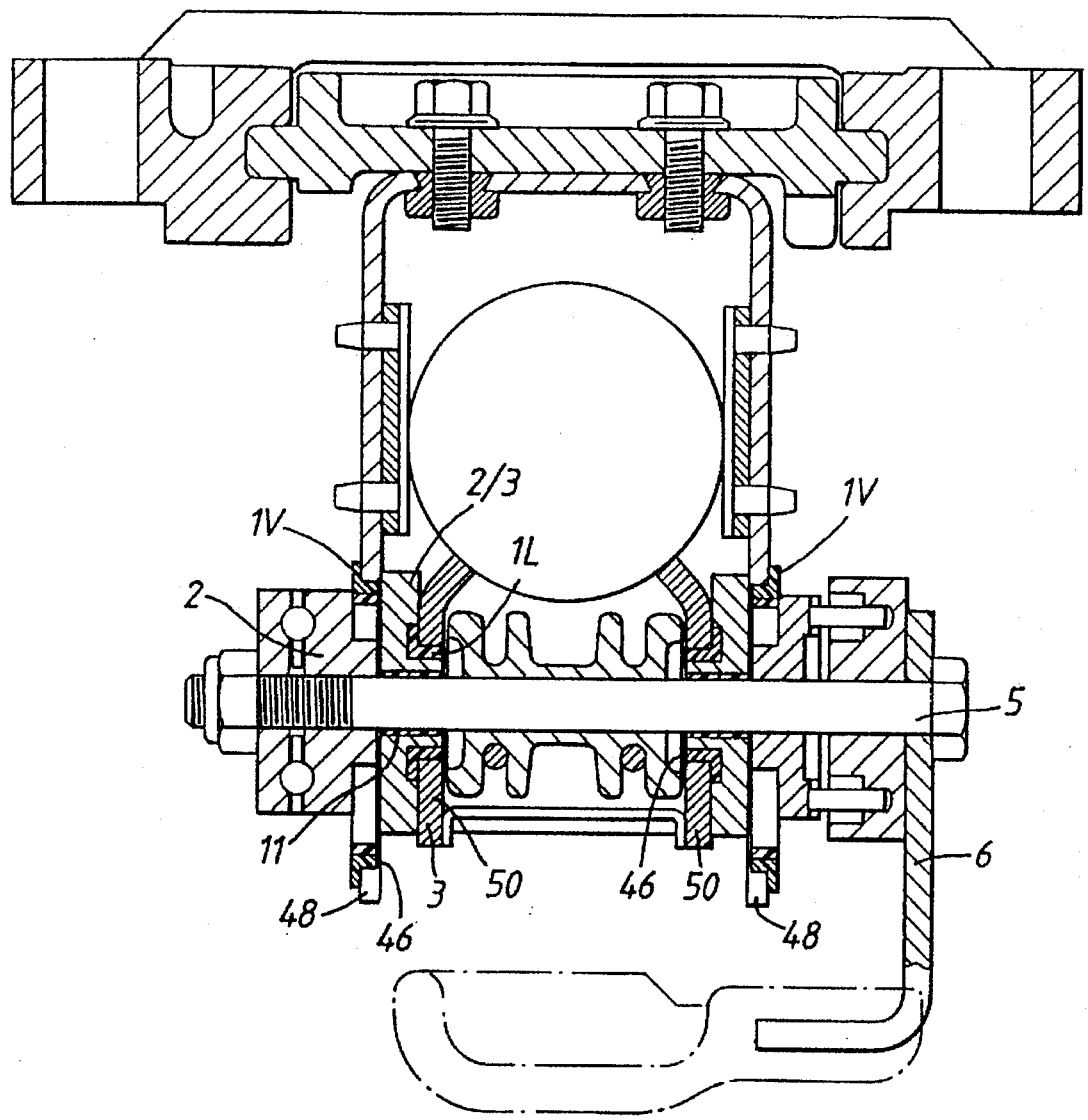
Figure 6:
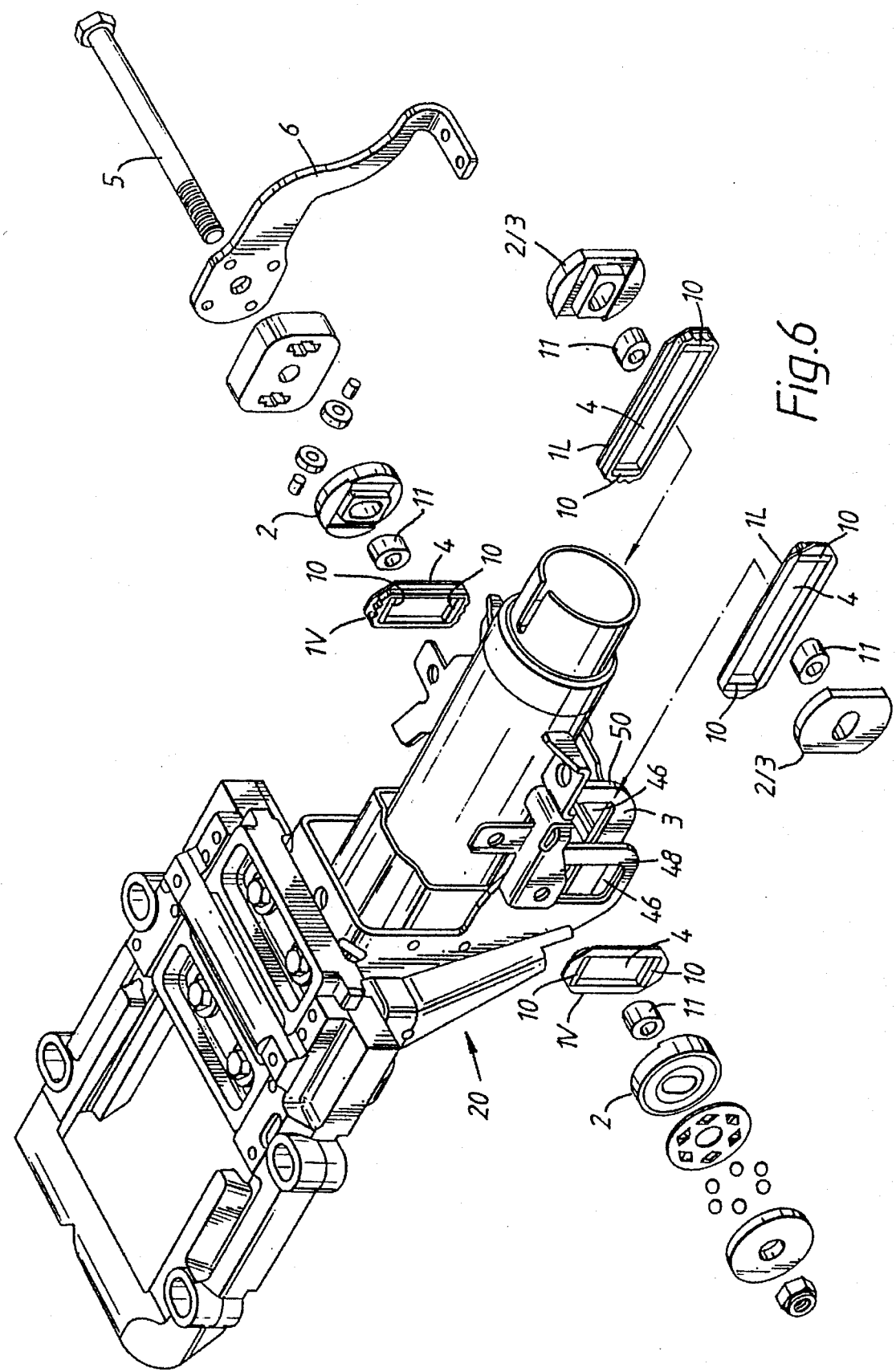
Figure 7:
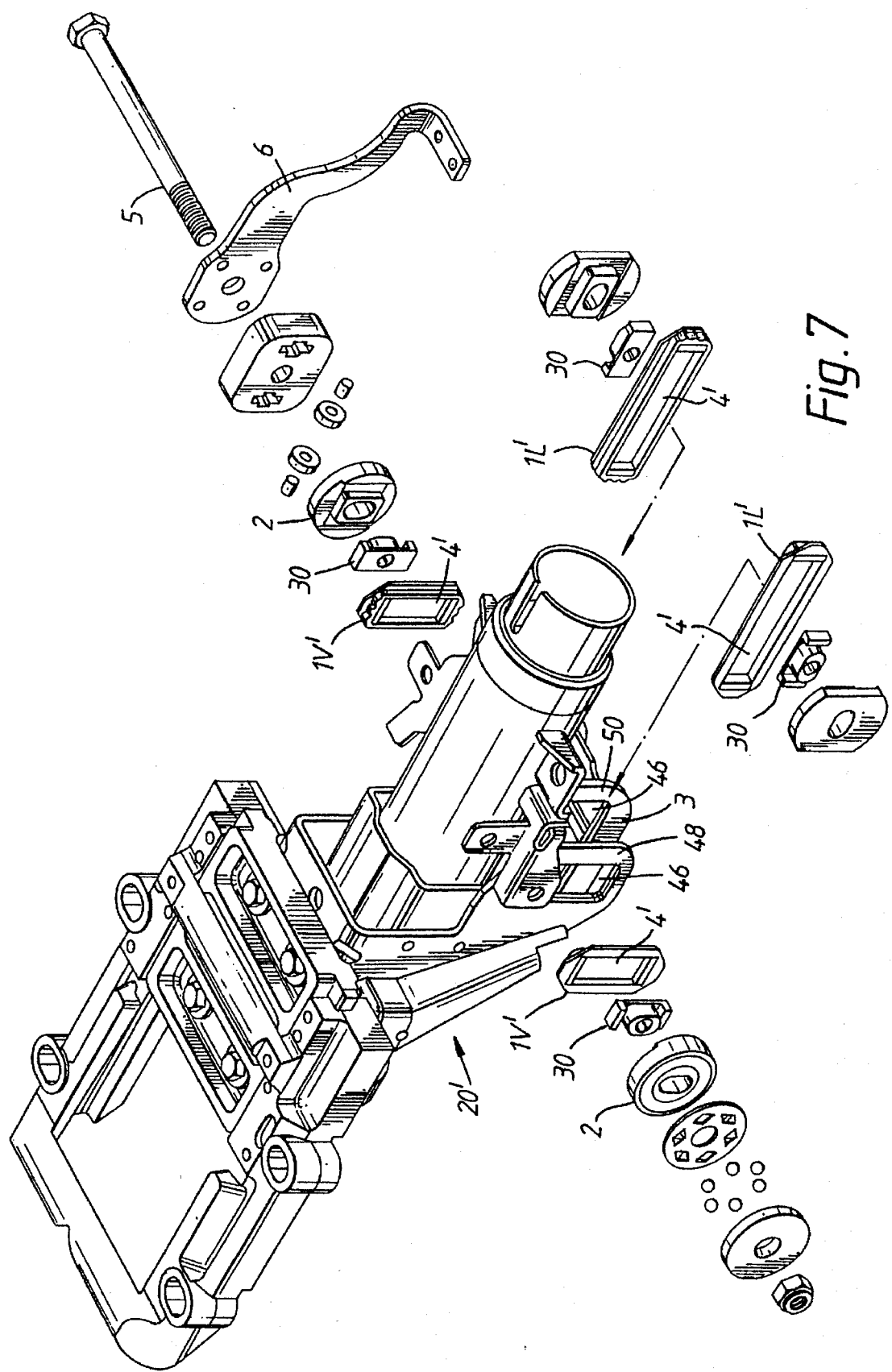
Figure 8:
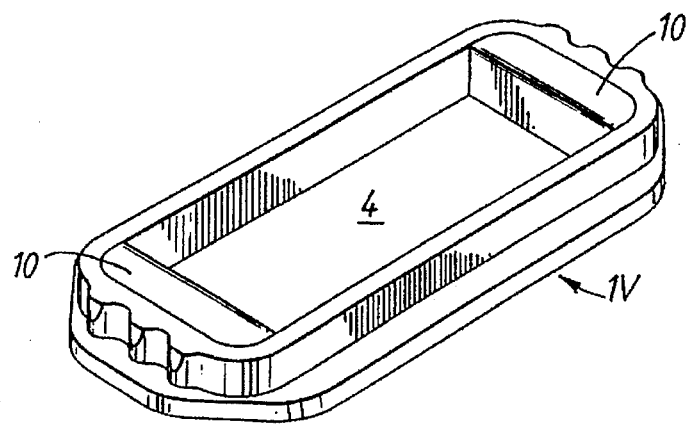
Figure 9:
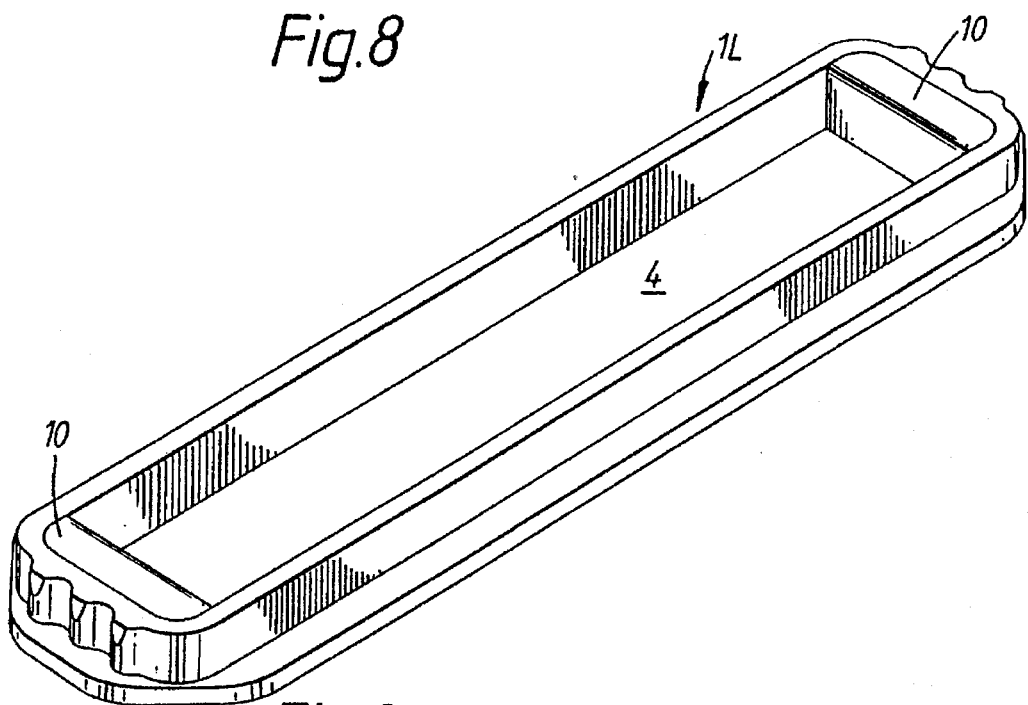
Figure 10:
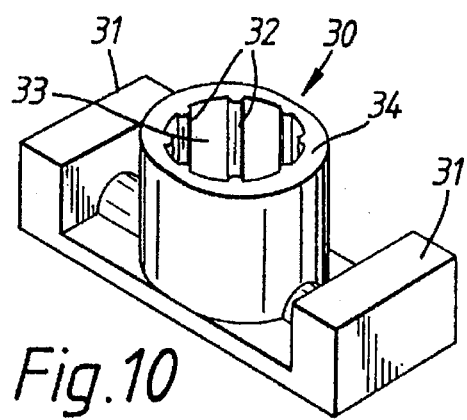
Figure 11:
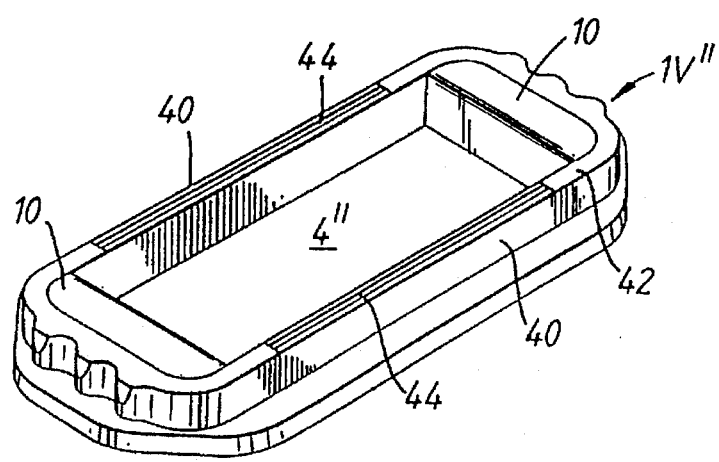
Figure 12:
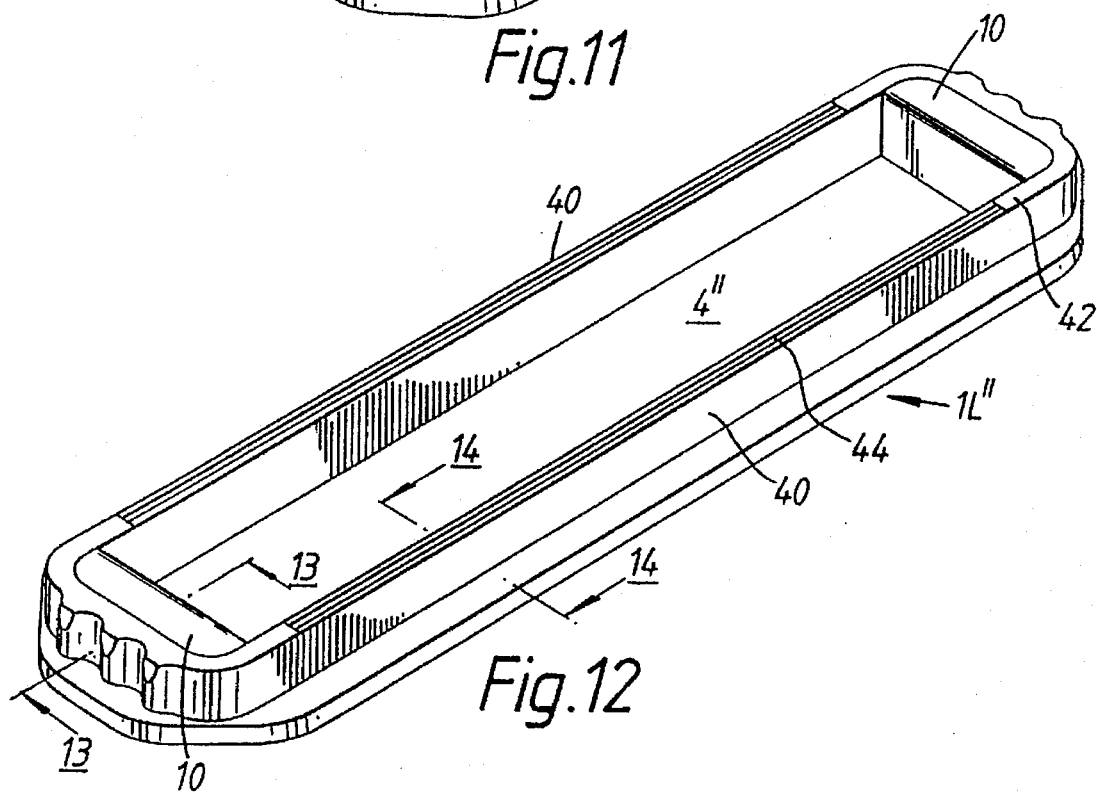
Figure 13:
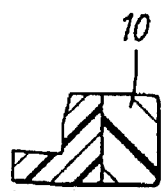

FIG. 3 in similar cross section to FIG. 2 but showing the clamped condition;

FIG. 4 is a side view, partly in section, which shows an adjustable steering column construction incorporating two of the antifriction elements of FIG. 1, one for linear adjustment of the column and the other for vertical adjustment of the column;

FIG. 5 is an end view in section of the construction of FIG. 4 using the antifriction element of FIG. 1;

FIG. 6 is an exploded perspective view of a construction similar to that of FIG. 4 using the antifriction element of FIG. 1;

FIG. 7 is an exploded perspective view similar to FIG. 6 but with an antifriction element according to a second embodiment of the invention;

FIG. 8 is a perspective view of a vertical antifriction element according to the first embodiment of the invention shown in FIG. 1 and used in the FIG. 6 construction;

FIG. 9 is a perspective View of a linear antifriction element according to the first embodiment of the invention shown in FIG. 1 and used in the FIG. 6 construction;

FIG. 10 is a perspective view of one of the antifriction elements according to the second embodiment used in the construction of FIG. 7;

FIGS. 11 and 12 perspective views of vertical and linear antifriction elements according to a third embodiment of the invention similar to those shown in FIGS. 8 and 9 for the construction of FIG. 6;

FIG. 13 is a cross section taken on line 13—13 of FIG. 12; and

Figure 14:
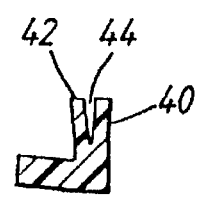

FIG. 14 is a cross section taken on line 14—14 of FIG. 12.

DETAILED DESCRIPTION

Our present U.S. application Ser. No. 08/263,857 describes a clamping mechanism with an antifriction element which allows for a dual purpose slotted liner which allows low friction plastics contact for adjustment and high friction metal contact for positive locking of the mechanism. This improves the "feel" to the user.

According to one aspect of the present invention, there is provided an antifriction element for use between relatively sliding components in a clamping mechanism of an adjustable steering column construction for a vehicle, the element being locatable between two said components wherein in an unclamped state of the components, a part of the element acts to urge the components away from contact with one another to allow relative free sliding of the components on the element and in a clamped state of the components said part is deflected to allow direct contact between surfaces of the components to provide the clamping friction and wherein the antifriction element allows sliding between limiting stops characterized in that a resilient means is provided between said stops.

The resilient means may be either a separate member inserted into a slot in the antifriction element or else resilient ends to a slot in the antifriction elements. The resilient ends may be formed as resilient inserts at the slot ends.

The provision of the resilient means enables a steering column to be adjusted so that as it reaches the limiting stops of its adjustment it is stopped softly.

According to another aspect of the invention there is provided a steering column comprising a first clamp member, a second clamp member slidable relative to the first clamp member, the first clamp member and second clamp member being in contact with one another when the steering column is in a clamped state; and an antifriction element as defined hereinbefore interposed between the first clamp member and the second clamp member.

In FIG. 1 there is shown diagrammatically an antifriction element in the form of a slotted flanged plastics liner 1 for interposition between two relatively sliding components 2,3 respectively of an adjustable steering column construction 20, as shown in FIG. 4.

The liner 1 has a longitudinal slot 4 providing limiting stops through which an adjustment bar 5 of an adjustment mechanism extends. The adjustment mechanism includes a clamp handle 6 which when moved to the broken line position of FIG. 4 tightens part 2 and 3 together. The liner 1 has two opposing flanges 7 extending in the liners unclamped state (FIG. 2) at an angle from the plane of a surface 8 of the liner. When the adjustment mechanism is tightened by the clamp handle to the position shown in FIG. 3 the liner assists to increase the clamping action. Liners 1 are normally provided in pairs that is a vertical liner 1V and a linear liner 1L (see FIG. 4). All this is as described in our co-pending U.S. patent application Ser. No. 08/263,857, hereafter referred to as "parent application", the subject matter of which is incorporated herein by reference.

A first improvement over the liners of the parent application is to provide a soft resilient block 10 of an elastomeric material either plastics or rubber at each end of slot 4. This is shown in detail in FIG. 8 which is a vertical liner 1V and FIG. 9 which is a linear liner 1L. The provision of blocks 10 cushions the impact of bolt 5 on the liner as the column stops at the end of the vertical and/or linear throw. In FIG. 6 which incorporates the liner of FIGS. 8 and 9 rubber sleeves 11 are provided to fit around bolt 5 and to slide in the liner slots 4.

A second embodiment is to provide cushioning in an adjustable steering column construction 20' by means of an antifriction element formed as a stop member. This is shown in FIG. 10 at 30 and in FIG. 7 where there are four such stop members which fit into and slide within slots 4' in antifriction elements 1V' and 1L' which are similar to those shown in FIGS. 8 and 9 but without cushioning blocks 10. The cushioning between the stop members and the antifriction elements is by means of the stop members 30 being formed as rubber moulded parts either solid rubber or rubber moulded over a metal form so that the ends 31 of the stop members 30 buffer against the limiting stops of the liner slot 4'. Also the stop members have internal ribs 32 within a hole 33 in a central boss 34 through which bolt 5 passes. The internal ribs act to prevent rattle. These are seen in FIG. 10.

A third improvement may be seen in vertical and linear antifriction elements 1V" and 1L" shown in FIGS. 11 to 14.

In the liner elements shown in FIGS. 11 to 14 longitudinal walls 40 either side of longitudinal slots 4" have their surfaces 42 provided with a slit 44 extending along most of the length of the slots 4". FIG. 14 shows the slit 44 open and in the uncompressed state before fitting into retaining slots 46 in clamping mechanism brackets 48 and 50 of either mechanism shown in FIG. 6 or FIG. 7. FIG. 13 shows the slit 44 closed under compression so that any rattle due to manufacturing tolerances is avoided. The slit 44 can be provided advantageously in a liner like those shown in FIGS. 8 and 9 having resilient cushion inserts 10 or in liners without inserts 10 as shown in FIG. 7 which are cushioned by stop members 30.

Having described the invention, what is claimed is:

1. A steering column clamping mechanism for an adjustable steering column comprising:
   a first clamp member;
   a second clamp member slidable relative to the first clamp member, the first clamp member and second clamp member being in contact with one another when the steering column is in a clamped state; and
   an antifriction element between the first clamp member and the second clamp member, the antifriction element biasing the first clamp member and the second clamp member out of contact with one another when the adjustable steering column is in an unclamped state, the first clamp member and the second clamp member each being in sliding contact with the antifriction element when the steering column is in the unclamped state and wherein the antifriction elements allows sliding between limiting stops provided by the ends of a slot in the antifriction element and wherein a resilient means is provided between said limiting stops.

2. A steering column clamping mechanism as claimed in claim 1 wherein the resilient means comprises resilient portions at the ends of the slot.

3. A steering column clamping mechanism as claimed in claim 1 wherein the resilient means is a separate member inserted in said slot.

4. A steering column clamping mechanism as claimed in claim 3 wherein the resilient means is formed with a central portion having a hole therethrough, the hole defined by a ribbed surface and so arranged to receive a clamping bar of the clamping mechanism, resilient portions extending outwardly from the central portion, each resilient portion being arranged to buffer against a respective one of the limiting stops of the slot in the antifriction element.

5. A steering column clamping mechanism as claimed in claim 1 wherein the slot is defined on each longitudinal side by a wall extending to a surface provided with a slit extending at least most of the length of the slot.

6. An antifriction element for use between relatively sliding components in a clamping mechanism of an adjustable steering column construction for a vehicle, the antifriction element being locatable between two said relatively sliding components wherein in an unclamped state of said relatively sliding components, a first part of the antifriction element acts to urge the components away from contact with one another to allow relative free sliding of said relatively sliding components, said first part is deflected to allow direct contact between surfaces of said relatively sliding components to provide the clamping friction and wherein the antifriction element allows sliding between limiting stops characterized in that a resilient means is provided between said limiting stops, said limiting stops being provided by the ends of a slot in the antifriction element.

7. An antifriction element as claimed in claim 6 wherein the resilient means comprises resilient portions at the ends of the slot.

8. An antifriction elements as claimed in claim 6 wherein the slot is defined on each longitudinal side by a wall extending to a surface provided with a slit extending at least most of the length of the slot.

9. An antifriction element as claimed in claim 6 wherein the resilient means is a separate member inserted in said slot.

10. An antifriction element as claimed in claim 9 wherein the resilient means is formed with a central portion having a hole therethrough, the hole defined by a ribbed surface and so arranged to receive a clamping bar of the clamping mechanism, resilient portions extending outwardly from the central portion, each resilient portion being arranged to buffer against a respective one of the limiting stops of the slot in the element.

* * * * *